United States Patent
Goto et al.

[11] Patent Number: 6,072,960
[45] Date of Patent: *Jun. 6, 2000

[54] CAMERA

[75] Inventors: Shigenori Goto; Akihiko Funaki, both of Saitama, Japan

[73] Assignee: Fuji Photo Optical Co., Ltd., Saitama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,242

[22] Filed: Jun. 16, 1997

[30] Foreign Application Priority Data

Jun. 19, 1996 [JP] Japan .................................. 8-158504

[51] Int. Cl.7 ............................. G03B 17/00; G03B 17/18
[52] U.S. Cl. ........................................... 396/292; 396/297
[58] Field of Search .................................... 396/281, 287, 396/292, 297, 298, 299, 310, 319

[56] References Cited

U.S. PATENT DOCUMENTS

| | | | |
|---|---|---|---|
| 5,579,066 | 11/1996 | Miyamoto et al. | 396/279 |
| 5,666,186 | 9/1997 | Meyerhoefor et al. | 396/281 |
| 5,701,520 | 12/1997 | Ishigoro et al. | 396/292 |
| 5,729,776 | 3/1998 | Maramora et al. | 396/310 |

*Primary Examiner*—Safet Metjahic
*Assistant Examiner*—Christopher E. Mahoney
*Attorney, Agent, or Firm*—Leydig, Voit & Mayer

[57] ABSTRACT

A camera has a memory for storing date information in a plurality of display patterns, the memory being capable of storing one of the plurality of display patterns as a home position, and a display for displaying the date information in the display pattern stored as the home position in the memory. The camera can display a desired display pattern readily and is excellent in operability.

10 Claims, 6 Drawing Sheets

CAMERA

BACKGROUND OF THE INVENTION

1. Field of the Invention

The present invention relates to a camera and, more particularly, to a camera capable of indicating a plurality of display patterns of date.

2. Related Background Art

Ordinary cameras are provided with a display section for display of date. In some cases the display section is required to display information other than the date display, for example, a lot of information pieces such as a camera photographing mode or a degree of consumption of battery. In such cases it is difficult for the display section to display the all information pieces of various kinds because of its limited display area. Therefore, displays of various information pieces are changed over one from another in a common region of the display section.

The display technology of camera of this type, however, has the following problems. Specifically, it becomes necessary to set a display mode for each of various information pieces in order to display the many information pieces. For realizing it, it is necessary to add a mode changeover switch for setting of display mode. In addition, the need also arises for a display area for indicating a predetermined display mode. Accordingly, addition of these switch and display area will result in increasing the component cost and increasing the size of camera.

For avoiding such inconveniences, it is thus conceivable to set many display patterns in a common display mode. If the many display patterns are set in the common display mode, many switch actuations will be necessitated for selecting a desired display pattern. The selection thus takes time and the selection work becomes very cumbersome.

SUMMARY OF THE INVENTION

The present invention has been achieved in order to solve the above problems and an object of the present invention is to provide a camera capable of readily indicating a desired display pattern and excellent in operability.

A camera according to the present invention is a camera capable of displaying date information in a plurality of display patterns, comprising:

memory means for storing the date information in the plurality of display patterns, the memory means being capable of storing one of the plurality of display patterns as a home position; and display means for displaying the date information in the display pattern stored as the home position in the memory means.

According to the present invention, the date information is stored as a home position in a desired display pattern, whereby the date information can be displayed in the desired display pattern in the date display mode. This enables the date display to be given in the desired display pattern without cumbersome switch actuations. In that case there is no need for provision of extra mode changeover switch and extra display area.

Since an existing switch is used in setting the home position in the display pattern of date display, no extra switch is needed. Therefore, the number of switches to be installed can be decreased.

It also becomes possible to indicate special information such as ID number input or manual focus input in the date display mode by changeover from the display pattern of date display.

It also becomes possible to effectively utilize the display means with the limited display area.

Since special information with high frequency in use is preferentially displayed, the switch actuations can be made efficiently.

In changeover from display of the special information to display of the date, the date display is indicated instantly in the desired display pattern. This requires no additional switch actuation.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the camera according to the present invention will be described with reference to the accompanying drawings. In the drawings the same elements will be denoted by the same reference symbols and redundant description will be omitted. The camera described in each embodiment is one used for APS (Advanced Photo System), but cameras according to the present invention are not limited to such cameras. For example, the present invention can also be applied to cameras used for the conventional 135 system (the system using 35 mm film).

Embodiment 1

Figure 1:
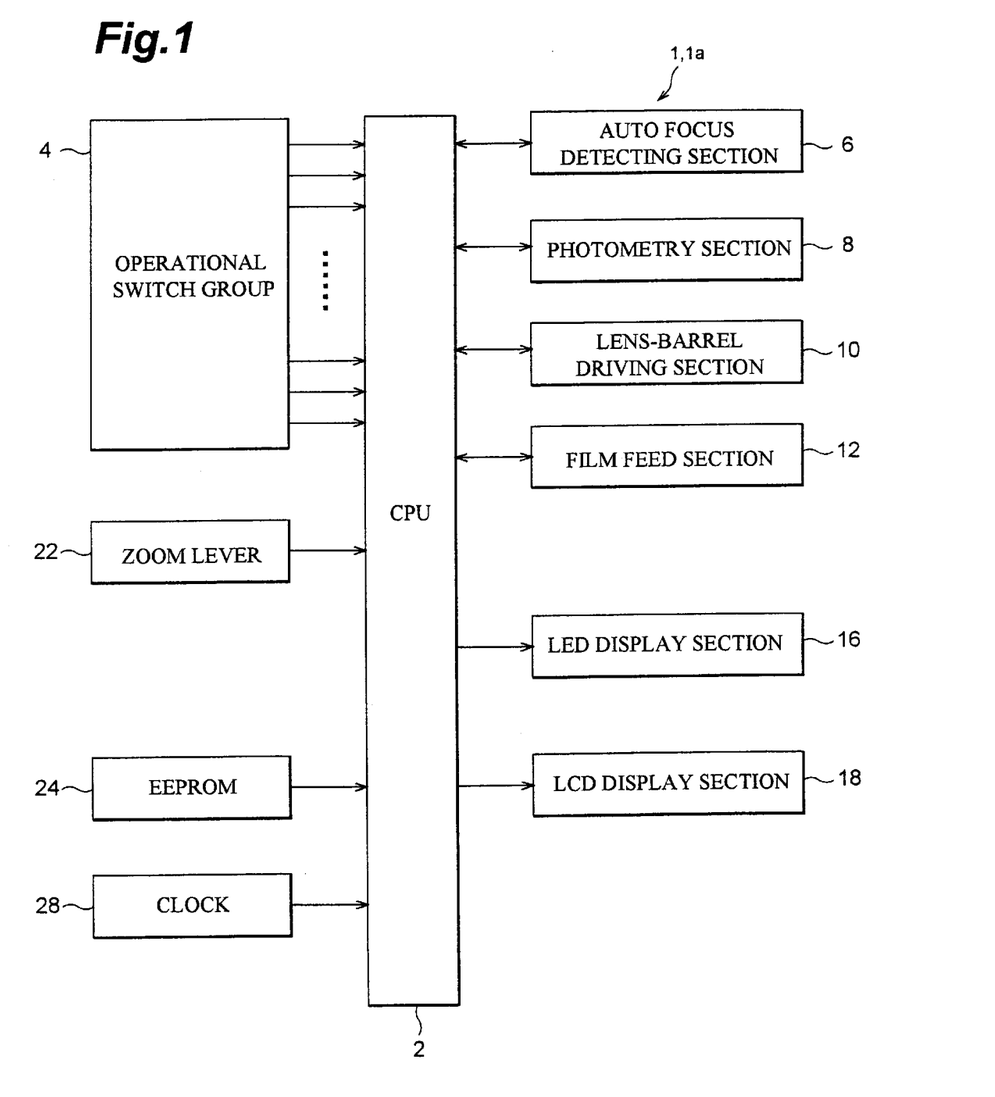
FIG. 1 is a block diagram to show the configuration of an electric system of a camera according to Embodiments 1 and 2 of the present invention.
Figure 2:
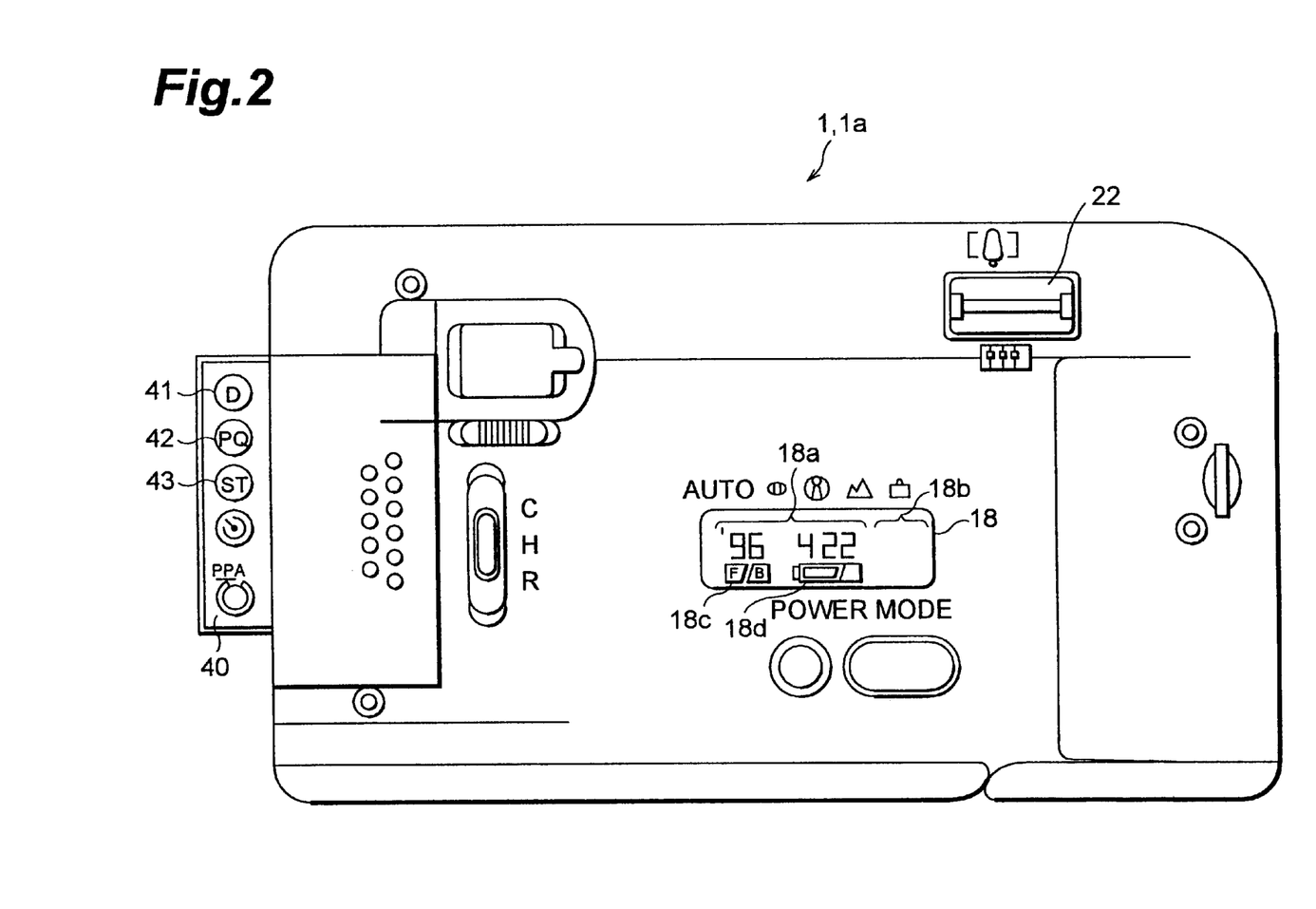
FIG. 2 is a schematic view of the structure of a camera according to Embodiments 1 and 2 of the present invention.
Figure 3:
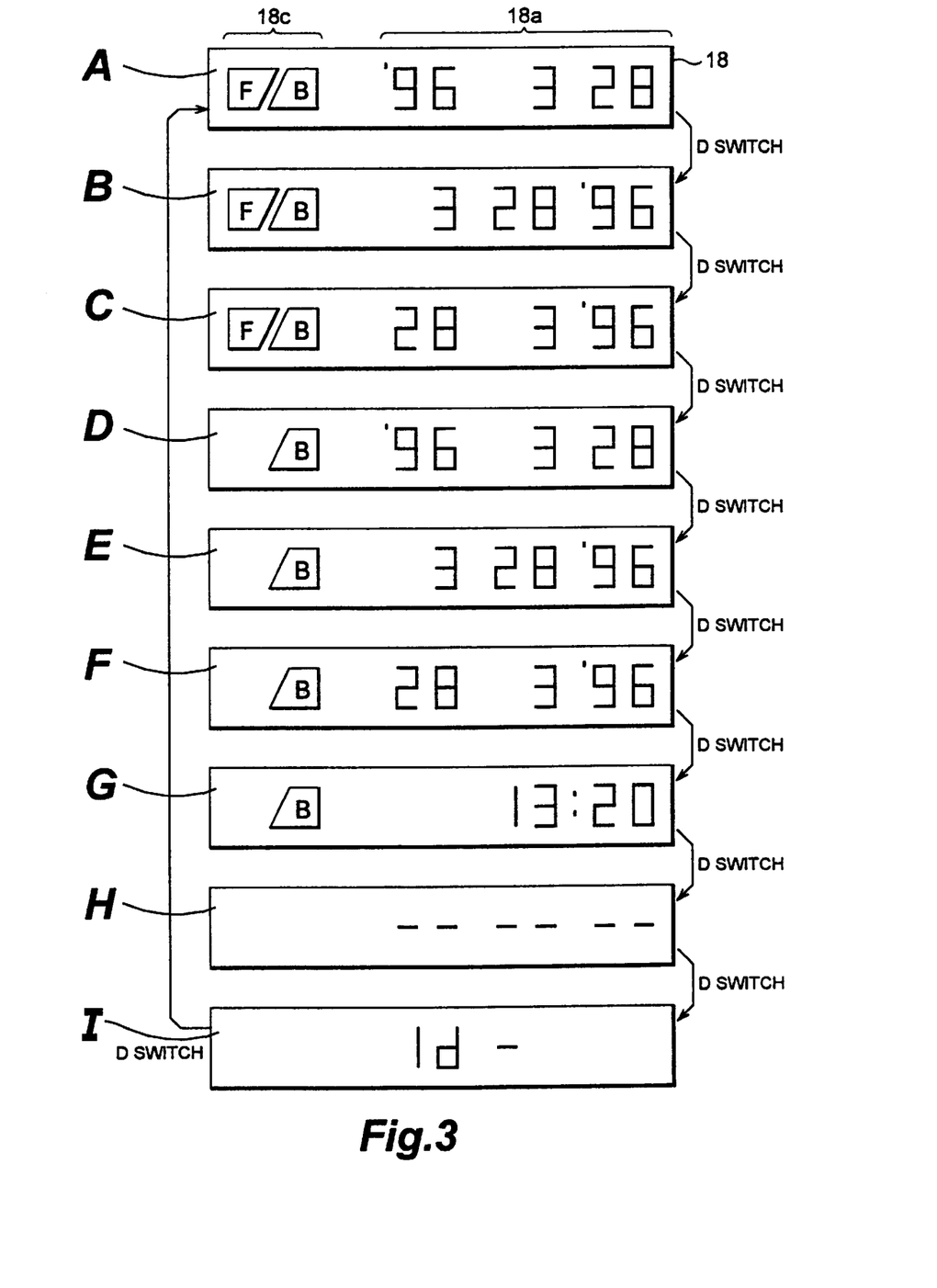
FIG. 3 is a schematic flow diagram showing a sequence of display patterns in the LCD display section of a camera according to Embodiment 1 of the present invention.

FIG. 1 is a block diagram to show the configuration of the electric system of camera in Embodiments 1 and 2 of the present invention and FIG. 2 is a view of appearance of the camera from the back. In FIG. 1, the camera 1 is provided with CPU 2 for control of the total camera. The CPU 2 controls the operation of camera 1, such as memory control, display control, or switch actuation determination, based on programs or the like. This CPU 2 may be a microcomputer. On the other hand, an LCD display section 18, being the display means, is connected to the CPU 2. This LCD display section 18 displays the date or special information, the operation mode and photographing condition of camera 1, etc. and has a function to give the display based on information of EEPROM 24. For example, the LCD display section 18 is provided nearly at the center of the back of camera 1, as shown in FIG. 2. Formed in the LCD display section 18 are a first display area 18a for displaying the date information etc., a second display area 18b for displaying the number of unexposed photographic frames, a third display area 18c for displaying a print from, and a fourth display area 18d for displaying consumption of battery. The first display area 18a can display six-digit numbers or six characters and displays the date or the special information under control of the CPU 2 being a display control means. Here, the special information means information except for the date, i.e., information concerning the operation of camera 1. For example, the special information includes information of time, information of ID number for specifying the film used for photography, information of manual focus, and so on. The ID number is a specific number of the film used for photography, particularly, one set when forced rewind is performed on the way of photography of film (while leaving unexposed photographic frames). Display patterns of the date in the LCD display section 18 include those displaying "year", "month", and "day" displaying "time" or displaying nothing, as shown in FIG. 3, block A–H. These all display patterns are displayed in order in the first display area 18a, based on actuation of predetermined switch. Following those display patterns of date display, the special information as in block I of FIG. 3 is displayed. On that occasion the display of date information and special information is given in the first display area 18a in the LCD display section 18, whereby the LCD display section 18 with the limited display area can be utilized effectively.

As shown in FIG. 1, the EEPROM 24, being the memory means, is connected to the CPU 2. This EEPROM 24 is a semiconductor memory for storing information, such as necessary for the operation of camera 1. The EEPROM 24 has functions to store the plurality of display patterns of date to be displayed in the LCD section 18, one of those display patterns as a home position, and the special information described above. The home position of display pattern of date herein means a status that can be preferentially displayed over the other display patterns. For example, it is the preferentially displayed status when the display is returned to the date display after setting of the ID number in the LCD display section 18. This memory means is not limited to nonvolatile semiconductor memories such as EEPROM 24, but may be any memory of other type as long as it has the aforementioned memory functions.

In FIG. 1, further connected to the CPU 2 are operational switch group 4, automatic focus detection section 6, photometry section 8, lens-barrel driving section 10 for zooming or the like, LED display section 16 comprised of a light emitting diode or the like for indicating completion of photography or the like, zoom lever 22, and clock 28. The operational switch group 4 is composed of a power switch for actuating the camera 1, a shutter release switch, a rewind switch, and switches for display operation. The switches for display operation are disposed in an inner surface of a lid 40 arranged to open and close on the side of camera 1, for example as shown in FIG. 2, and they include D switch 41, PQ switch 42, ST switch 43, etc. FIG. 2 illustrates the open state of the lid 40. Among the switches for display operation the D switch 41 is mainly for switching the display of the LCD display section 18. For example, when the D switch 41 is depressed under display of the date in the first display area 18a of the LCD display section 18 as shown in FIG. 3, the display patterns of date are changed over one from another in order. With further depression of the D switch 41, the display is changed over successively to the display of time, to the display of nothing, and to the display of ID number input mode. The PQ switch 42 is used mainly upon setting of the number of prints in the photographic frames of film and is also used upon setting of ID number or upon selection of ID number. Further, the ST switch 43 is used for selection of title in the photographic frames and is also used upon setting of ID number.

Figure 4:
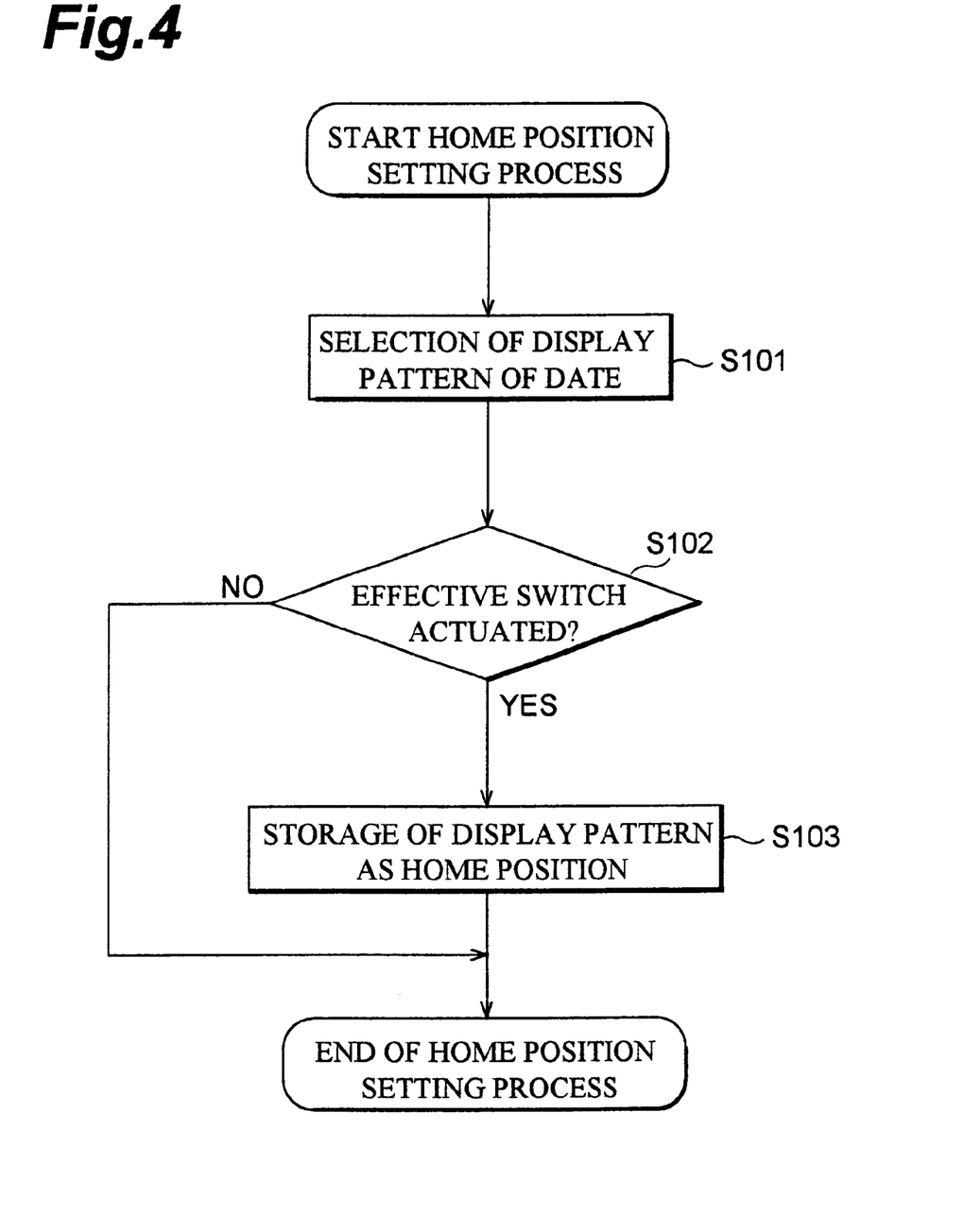
FIG. 4 is a flowchart to show a home position setting process of a camera according to Embodiment 1 of the present invention.

Next described referring to FIG. 3 and FIG. 4 is the home position setting process of date information of camera 1.

In FIG. 3, blocks A–I are explanatory drawings of display patterns in the LCD display section 18. FIG. 4 is a flowchart to show the home position setting process. Block A–I of FIG. 3 show the simplified form of the LCD display section 18 to indicate only the first display area 18a and third display area 18c.

As shown in FIG. 4, with start of the home position setting process, step S101 is first carried out to select a display pattern as the home position to be preferentially displayed when the LCD display section 18 is turned to the date display. Specifically, with depression of the D switch 41 of camera 1, the date display in the LCD display section 18 is switched in order among the different display patterns, as shown in FIGS. 3A to 3H. Then a desired display pattern of date is displayed in the LCD display section 18.

Then step S102 is carried out to determine whether an actuation of an effective switch was made or not. Here, the effective switch is one except for the D switch 41, PQ switch 42, and ST switch 43, and is, for example, the shutter release switch, the zoom lever, or the like. This determination of actuation of effective switch is carried out by detecting an input signal to the CPU 2 upon actuation of the shutter release switch or the like. This setting process is ended if no actuation of effective switch is made. If an actuation of effective switch is made then the process proceeds to step S103.

At step S103, stored as the home position is the display pattern of date displayed in the LCD display section 18 upon the actuation of effective switch. Namely, when either one of the effective switches is actuated, a command signal is output from the CPU 2 to the EEPROM 24 and in accordance to the command signal the EEPROM 24 performs such storage that the display pattern displayed upon the actuation of effective switch is to be displayed preferentially. Then this process is ended.

In this home position setting process the storing process of the display pattern of date to become the home position is activated by an actuation of the existing switch such as the shutter release switch, and therefore, no extra switch needs to be set in the camera 1.

Figure 5:
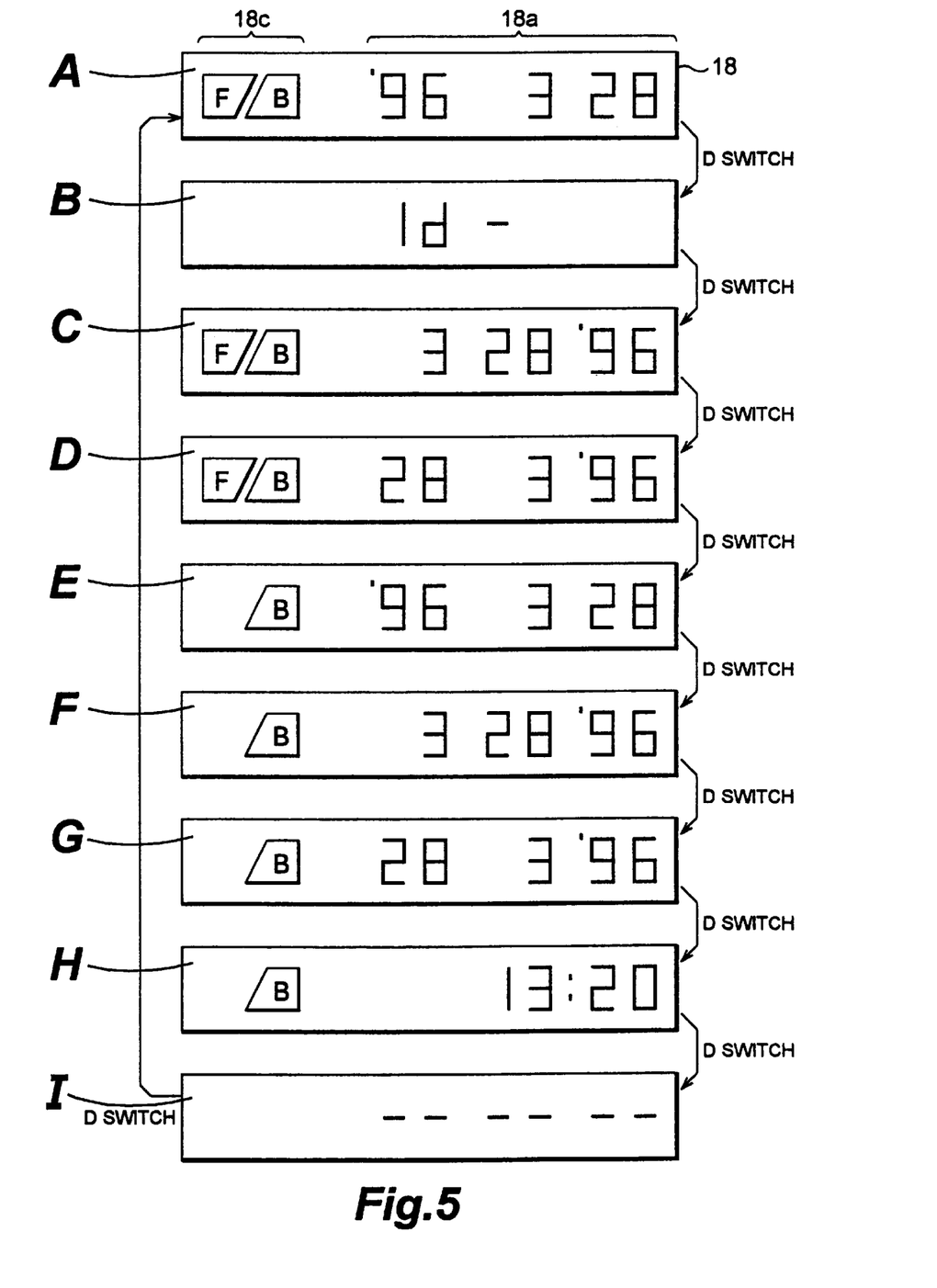
FIG. 5 is a schematic flow diagram showing a sequence of display patterns in the LCD display section of a camera according to Embodiment 1 of the present invention.

Next described referring to FIG. 5 is the preferential display function in the camera 1.

In the camera 1 the display pattern of date stored as the home position as described above is displayed preferentially. For example, if the display pattern of "96 3 28 ", shown in block A of FIG, 5 (where the pattern is displayed in the order of year, month, day), is stored as the home position of date display, depression of the D switch 41 will change the date display into the ID number input mode shown in block B of FIG. 5. When the D switch 41 is then depressed after completion of input process, of predetermined ID number in the ID number input mode, the display pattern of "96 3 28" shown in block B of FIG. 5, being the home position, is displayed again. This means that if no input process of ID number is carried out, the display patterns shown in blocks A–I of FIG. 5 will be displayed in order in the LCD display section 18 with actuations of the D switch 41. If the input process of ID number is carried out, an actuation of the D switch 41 after the input process will result in displaying the display pattern of "96 3 28" shown in FIG. 5A, being the home position instantly. Therefore, the desired display pattern can be displayed without displaying the other display patterns (block A of FIG. 5) by many depressions of the D switch 41, thus eliminating the cumbersome switch actuations.

Provision of the above preferential display function of home position allows the display pattern of home position desired to display to be displayed instantly even with the special information (FIG. 5B) being incorporated in the rotation of the display patterns, which can avoid a disadvantage due to the increase in switch actuations. In more detail, after the aforementioned input process of ID number or time adjustment is carried out, the display pattern of the home position is displayed without displaying the other display patterns, which can omit the switch actuations for the other patterns.

Further, the preferential display function in the camera 1 is arranged in such a way that the display is controlled so as to display the predetermined special information after the display pattern of the home position in the date display. For example, when the D switch 41 is depressed with displaying the display pattern of the home position, the ID number input display (ID number input mode), being the display of special information, is displayed. In general, it is rare in use of camera 1 for the user to frequently change the setting after setting a pattern of date information once. When the display changeover switch (D switch 41) is used in common to the display of date information and special information, the frequency of display of special information is considered to be higher than that of change of the home position being the pattern of date display. Therefore, the excessive switch actuations can be omitted by displaying the special information with high frequency in use, for example, the ID number input display after the display pattern of the home position.

The above example showed that the home position was the display pattern shown in block A of FIG. 5, but the display pattern shown in block C of FIG. 5 may be selected as the home position by the aforementioned setting of home position. In this case, when the D switch 41 is actuated with the display pattern shown in block C of FIG. 5 being displayed, the display changes to the ID number input display shown in block of FIG. 5. Therefore, the excessive switch actuations can be omitted and the operability of camera 1 can thus be improved by preferentially displaying the special information with a higher frequency in use than those of the display patterns of date except for the home position, after the display pattern of the home position.

Embodiment 2

Figure 6:
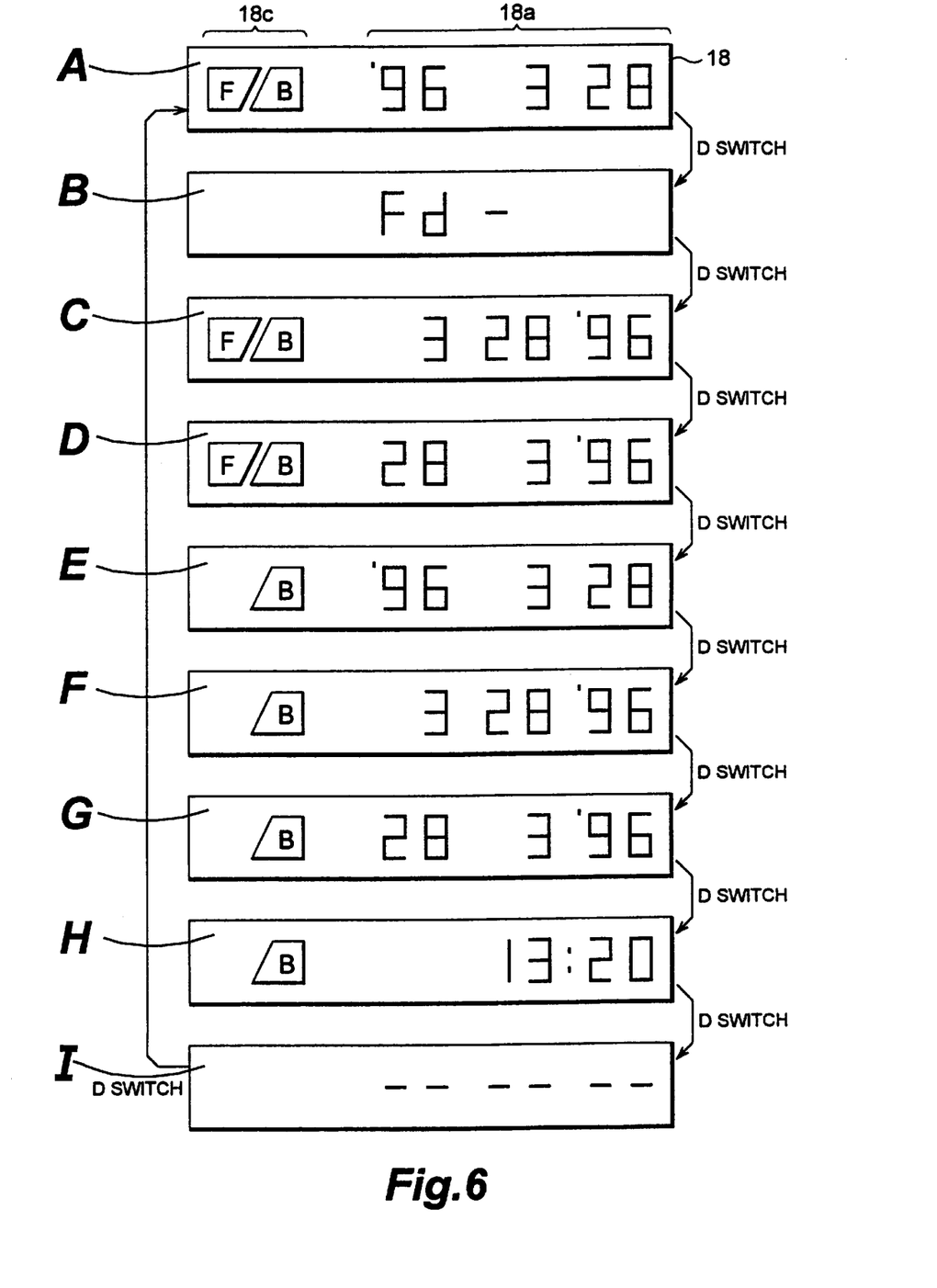
FIG. 6 is a schematic flow diagram a sequence of display patterns in the LCD display section of a camera according to Embodiment 2 of the present invention.

The camera 1 according to Embodiment 1 described above was arranged to set the input display of ID number as the special information displayed after the display pattern of the home position. However, without having to be limited to this way of display, another special information with high frequency in use may be selected instead. Specifically, the camera 1a according to Embodiment 2 is arranged in such a way that the special information displayed after the display pattern of the home position is the manual focus setting display, as shown in FIG. 6. This camera 1a also permits setting of the home position and has the preferential display function, as in the above-stated camera 1. Therefore, the camera 1a can also achieve the same operational effects as the camera 1 according to Embodiment 1.

As described above, the present invention can attain the following effects.

Specifically, by storing a desired display pattern in date display as the home position, the date can be displayed in the desired display pattern in the date display mode. This allows the date to be displayed in the desired display pattern without performing the cumbersome switch actuations. There is no need for provision of extra mode changeover switch or extra display area for the display.

Since the existing switch can be used in setting the home position of display pattern of date, no extra switch is needed for the setting. This can decrease the number of installed switches.

Further, in the date display mode the special information such as the ID number input, the manual focus input, or the like can be displayed as changed over from the display pattern of date display.

Since the display of special information is given in the same display area in the display means as the display of date information is, the display means with the limited display area can be utilized effectively.

Further, when the changeover switch is actuated with the date display being given in either one of the display patterns, the display means preferentially displays the special information with high frequency in use, such as the ID number input or the manual focus input. When the changeover switch is actuated with the special information, such as the ID number input or the manual focus input, being displayed on the display means, the display pattern of date of the home position is displayed instantly on the display means. This obviates the need for the excessive switch actuations and improves the operability.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 158504/1996 filed on Jun. 19, 1996 is hereby incorporated by reference.

What is claimed is:

1. A camera for displaying date information in a plurality of display patterns, said camera comprising:

memory means for storing a plurality of display patterns of date information, said memory means storing a first display pattern of the plurality of display patterns as a home position;

a first switch for storing a displayed display pattern as the home position;

display means for displaying the first display pattern of date information stored as the home position in said memory means in preference to other display patterns of date information;

switch actuation determining means for determining whether said first switch is actuated while any one of the display patterns of date information is displayed by said display means;

memory control means for controlling said memory means to store, when said switch actuation determining means determines that said first switch is actuated, the display pattern of date information displayed at that time as the home positions a second switch for sequentially switching display of the plurality of display patterns of date information and for returning to a display of the first display pattern; and a third switch for entering special information, different from date information, when the special information is displayed by said display means, wherein said display means switches from display of the special information to display of the first display pattern in response to a single actuation of said second switch after the special information is programmed.

2. The camera according to claim 1, wherein said display means includes a display area and the special information and the date information are both displayed in the display area of said display means.

3. The camera according to claim 1, wherein said display control means controls said display means to display the special information when the second switch is actuated during display of any of the plurality of display patterns of date information on said display means.

4. The camera according to claim 1, wherein said display control means controls said display means to display the date information in the first display pattern stored as the home position when the second switch is actuated during display of the special information on said display means.

5. The camera according to claim 1, wherein the special information is manual focus setting.

6. The camera according to claim 1, wherein said first switch is selected from the group consisting of a shutter release and a zoom lever.

7. A camera for displaying date information in a plurality of display patterns, said camera comprising:

memory means for storing a plurality of display patterns of date information, said memory means storing a first display pattern of the plurality of display patterns as a home position;

display means for displaying the first display pattern of date information stored as the home position in said memory means in preference to other display patterns of date information;

a first switch for sequentially switching display of the plurality of display patterns of date information and for returning to a display of the first display pattern; and a second switch for entering special information, different from date information, when the special information is displayed by said display means, wherein said display means switches from display of the special information to display of the first display pattern in response to a single actuation of said first switch after the special information is programmed.

8. The camera according to claim 7, comprising a third switch for storing a displayed display pattern as the home position.

9. The camera according to claim 8, wherein said third switch is selected from the group consisting of a shutter release and a zoom lever.

10. The camera according to claim 8, comprising switch actuation determining means for determining whether said third switch is actuated while any one of the display patterns of date information is displayed by said display means.

* * * * *